(12) United States Patent
Alley et al.

(10) Patent No.: US 11,655,029 B2
(45) Date of Patent: May 23, 2023

(54) ROTATING RELEASE LAUNCHING SYSTEM

(71) Applicant: Anduril Industries, Inc., Costa Mesa, CA (US)

(72) Inventors: Nicholas Robert Alley, Marietta, GA (US); Jesse Owen Williams, Marietta, GA (US); Matthew Gordon Brasher, Marietta, GA (US)

(73) Assignee: Anduril Industries, Inc., Costa Mesa, CA (US)

( * ) Notice: Subject to any disclaimer, the term of this patent is extended or adjusted under 35 U.S.C. 154(b) by 0 days.

(21) Appl. No.: 17/567,330

(22) Filed: Jan. 3, 2022

(65) Prior Publication Data

US 2022/0274704 A1 Sep. 1, 2022

Related U.S. Application Data

(63) Continuation of application No. 17/089,937, filed on Nov. 5, 2020, now Pat. No. 11,214,370.

(60) Provisional application No. 63/019,967, filed on May 4, 2020.

(51) Int. Cl.
*B64D 1/02* (2006.01)

(52) U.S. Cl.
CPC ..................... *B64D 1/02* (2013.01)

(58) Field of Classification Search
CPC ... B64D 1/02; B64D 1/04; B64D 1/06; B64D 1/08; B64D 1/12
See application file for complete search history.

(56) References Cited

U.S. PATENT DOCUMENTS

| 1,172,542 | A | | 2/1916 | McMullen | |
|---|---|---|---|---|---|
| 1,368,322 | A | * | 2/1921 | Clarke | B64D 1/04 89/1.51 |
| 2,071,594 | A | * | 2/1937 | Trimbach | B64D 1/06 89/1.51 |
| 2,731,885 | A | * | 1/1956 | Nolan | B64D 1/06 89/1.806 |

(Continued)

FOREIGN PATENT DOCUMENTS

| AU | 2022211806 | 8/2022 |
|---|---|---|
| AU | 2021266692 | 10/2022 |

(Continued)

OTHER PUBLICATIONS

International Search Report and Written Opinion dated Oct. 12, 2021 cited in Application No. PCT/US2021/030507, 9 pgs.

(Continued)

*Primary Examiner* — Benjamin P Lee
(74) *Attorney, Agent, or Firm* — Bekiares Eliezer LLP

(57) ABSTRACT

The present disclosure provides rolling release launching system that is operative to receive and retain a drone or other payload in a protected launcher. The launcher helps to reduce the drag of the payload and to protect the payload from environmental factors. The payload is launched when a rotating door opens to expose the payload in a bay area. The rotating door may be parallel or concentric to a longitudinal axis of the body portion of the device. The payload may be launched using a biasing and fastening mechanism, which may include detachably coupling bracket, to induce an angular moment and releasing force on the payload during launch.

18 Claims, 11 Drawing Sheets

(56) References Cited

U.S. PATENT DOCUMENTS

| | | | |
|---|---|---|---|
| 2,856,181 A | 10/1958 | Fenton | |
| 2,947,533 A * | 8/1960 | Brumby | B64D 1/04 |
| | | | 89/1.51 |
| 4,256,012 A * | 3/1981 | Cowart | B64D 1/08 |
| | | | 89/1.51 |
| 4,781,342 A * | 11/1988 | Hardy | B64D 1/04 |
| | | | 244/130 |
| 5,257,758 A | 11/1993 | Hassel | |
| 6,119,976 A | 9/2000 | Rogers | |
| 6,679,454 B2 | 1/2004 | Olsen et al. | |
| 8,893,605 B1 | 11/2014 | Hester, Jr. et al. | |
| 9,180,967 B2 * | 11/2015 | Binkholder | B64D 7/08 |
| 9,505,496 B2 * | 11/2016 | Markov | B64D 1/12 |
| 10,086,942 B2 | 10/2018 | White | |
| 10,259,560 B2 * | 4/2019 | Ivans | B64D 1/04 |
| 10,822,084 B2 | 11/2020 | Colosimo | |
| 11,027,842 B1 | 6/2021 | Albrecht et al. | |
| 11,117,667 B1 | 9/2021 | McGann et al. | |
| 11,214,370 B2 | 1/2022 | Alley et al. | |
| 11,319,087 B2 | 5/2022 | Miralles et al. | |
| 2003/0192992 A1 * | 10/2003 | Olsen | F41A 9/73 |
| | | | 244/137.1 |
| 2005/0134685 A1 | 6/2005 | Egnal et al. | |
| 2005/0204910 A1 * | 9/2005 | Padan | B64D 1/04 |
| | | | 89/1.813 |
| 2006/0289699 A1 | 12/2006 | Wada et al. | |
| 2008/0105112 A1 | 5/2008 | Grabmeier | |
| 2010/0327115 A1 * | 12/2010 | Cenko | B64D 1/02 |
| | | | 244/130 |
| 2013/0221158 A1 | 8/2013 | Binkholder et al. | |
| 2016/0257421 A1 | 9/2016 | Ye et al. | |
| 2016/0288906 A1 * | 10/2016 | Christof | B64D 7/00 |
| 2017/0101181 A1 | 4/2017 | Mern et al. | |
| 2017/0369150 A1 | 12/2017 | Finklea et al. | |
| 2018/0281953 A1 | 10/2018 | Groen | |
| 2020/0324934 A1 * | 10/2020 | Weekes | B65D 7/44 |
| 2021/0339865 A1 | 11/2021 | Alley et al. | |
| 2022/0234755 A1 | 7/2022 | Demonfort et al. | |

FOREIGN PATENT DOCUMENTS

| | | |
|---|---|---|
| CA | 3175479 | 10/2022 |
| GB | 904213 | 8/1962 |
| GB | 2361985 | 11/2001 |
| IL | 297072 | 10/2022 |
| IN | 202227057287 | 10/2022 |
| JP | 2022-563135 | 10/2022 |
| KR | 10-2022-7039302 | 11/2022 |
| WO | 2005023642 A2 | 3/2005 |
| WO | 2011066030 A2 | 6/2011 |
| WO | 2013121031 A1 | 10/2020 |
| WO | 2021225979 A1 | 11/2021 |

OTHER PUBLICATIONS

U.S. Non-Final Office Action dated Sep. 29, 2022 cited in U.S. Appl. No. 17/691,379, 19 pgs.
Australian Examination Report No. 1 dated Nov. 10, 2022 cited in Application No. 2022211806, 4 pgs.

* cited by examiner

ROTATING RELEASE LAUNCHING SYSTEM

RELATED APPLICATIONS

This application is a continuation of U.S. application Ser. No. 17/089,937 filed Nov. 5, 2020, which issues on Jan. 4, 2022 as U.S. Pat. No. 11,214,370, which claims benefit under the provisions of 35 U.S.C. § 119(e) of U.S. Provisional Application No. 63/019,967 filed May 4, 2020, which are incorporated herein by reference in its entirety.

It is intended that the above-referenced application may be applicable to the concepts and embodiments disclosed herein, even if such concepts and embodiments are disclosed in the referenced applications with different limitations and configurations and described using different examples and terminology.

FIELD OF DISCLOSURE

The present disclosure relates to aviation equipment, and more specifically, to equipment that releases a payload from an aircraft.

BACKGROUND

It is often desirable to release payload from an aircraft. Indeed, aircraft release munitions, sensors, buoys, and other devices during military, scientific and public safety operations. These payloads are often attached externally on an aircraft and are exposed to environmental conditions while the aircraft operates. Such exposure may undesirably impact the flight characteristics and functionality of the payload and cause damage to the payload.

Payloads such as drones and munitions often have deployable control surfaces that extend outwardly from the body of the drone upon flight or prior to flight. A disadvantage of this arrangement is that if a drone or munition is exposed to the airflow under the wings, the flight surfaces may extend undesirably while the payload drone is still attached to the aircraft. The aircraft may also be susceptible to foreign object damage (FOD) if the payload loses a component in flight. Such an incident could cause damage to the payload or aircraft.

BRIEF OVERVIEW

This brief overview is provided to introduce a selection of concepts in a simplified form that are further described below in the detailed description. This brief overview is not intended to identify key features or essential features of the claimed subject matter. Nor is this brief overview intended to be used to limit the claimed subject matter's scope.

A rotating release launching system (also referred to herein as a "launcher") consistent with embodiments of the present disclosure may retain a payload and provide for a "rolling" or "rotating" of the payload. The launcher may comprise a body portion; a bay area partially defined by the body portion; a door portion operative to rotate within the body portion to expose at least a portion of the bay area; and a biasing portion configured to transfer an angular momentum of the rotating door portion to the payload arranged within the door portion.

The launcher may comprise a body having a substantially tubular shape. The door portion may serve as a shuttle for the payload. The door portion may be operative to rotate in a substantially elliptical path to expose the bay area of the launcher. The bay area may be partially defined by a cavity in the body portion generated by the rotation of the door portion.

The payload may be arranged and retained within the door portion of the body. As the door portion revolves and exposes the bay area of the launcher, the payload may be released through the bay area with the angular momentum (or rotating inertia) that is generated by the door's rotation, thereby providing the rolling release of the payload out of the launcher from its bay area.

Still consistent with embodiments of the present disclosure, the door portion of the body may comprise at least one biasing and fastening mechanism. The at least one biasing and fastening mechanism may comprise, for example, but not be limited to, at least one bracket. The at least one bracket may be used to facilitate a desired alignment of the payload within the body and a desired momentum upon release from the bay area.

Accordingly, in some embodiments, the at least one biasing mechanism may comprise at least one bracket to further facilitate at least one of the following: i) the desired alignment of the payload within the body; and ii) desired release dynamics of the payload as it leaves the bay area. For example, the at least one bracket may be configured to detachably couple with at least a portion of the payload. The detachable coupling mechanism may be configured to, for example: i) retain the payload in a first orientation of the door portion, and/or ii) release the payload at a second orientation.

In the first orientation, the payload may be arranged resting within the door portion. Here, the at least one biasing mechanism may contribute to the retention of the payload's position and orientation. In a second orientation, the door portion may be rotated within the body to expose the bay area. Here, the at least one biasing mechanism may be designed to decouple the payload such that it may be released from the exposed bay area.

Accordingly, the biasing mechanism coupling the door portion with at least a portion of the payload enables a transition of the retained payload from the first orientation to the second orientation and, in turn, transfers an angular momentum to the payload as the door portion rotates within the body of the launcher to expose the bay area. Said angular momentum transferred to the payload provides for a "rolling" and "rotating" release of the payload as it exits the bay area.

In some embodiments, the door portion of the body may further comprise at least one force generating mechanism. The at least one force generating mechanism may be configured to apply a force in order to provide for at least one of the following: i) arrange the payload within the body at the first orientation, and ii) eject the payload from the bay area in the second orientation.

In the first orientation, the biasing mechanism and the force generating mechanism, according to the respective embodiments of the launcher in which they may be comprised, may enable a desired position and orientation of the payload within the body of the launcher.

In the second orientation, the biasing mechanism and the force generating mechanism, according to the respective embodiments of the launcher in which they may be comprised, may facilitate the generation of the rotating inertia as well as an added force upon the payload's release from the bay area. In this way, where the payload may be designed to expand upon a release from the launcher, such expansion may occur a greater displacement from the launcher than would otherwise occur without the additional force provided by the force generating mechanism.

The orientation of the payload may be important in various applications. For instance, in some embodiments, the payload may be an unmanned aerial vehicle designed to deploy one or more control surfaces upon release from the launcher. In such embodiments, a proper orientation of the payload, as it is released from the launcher, may provide for a more calculated expansion of its control surfaces upon release.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
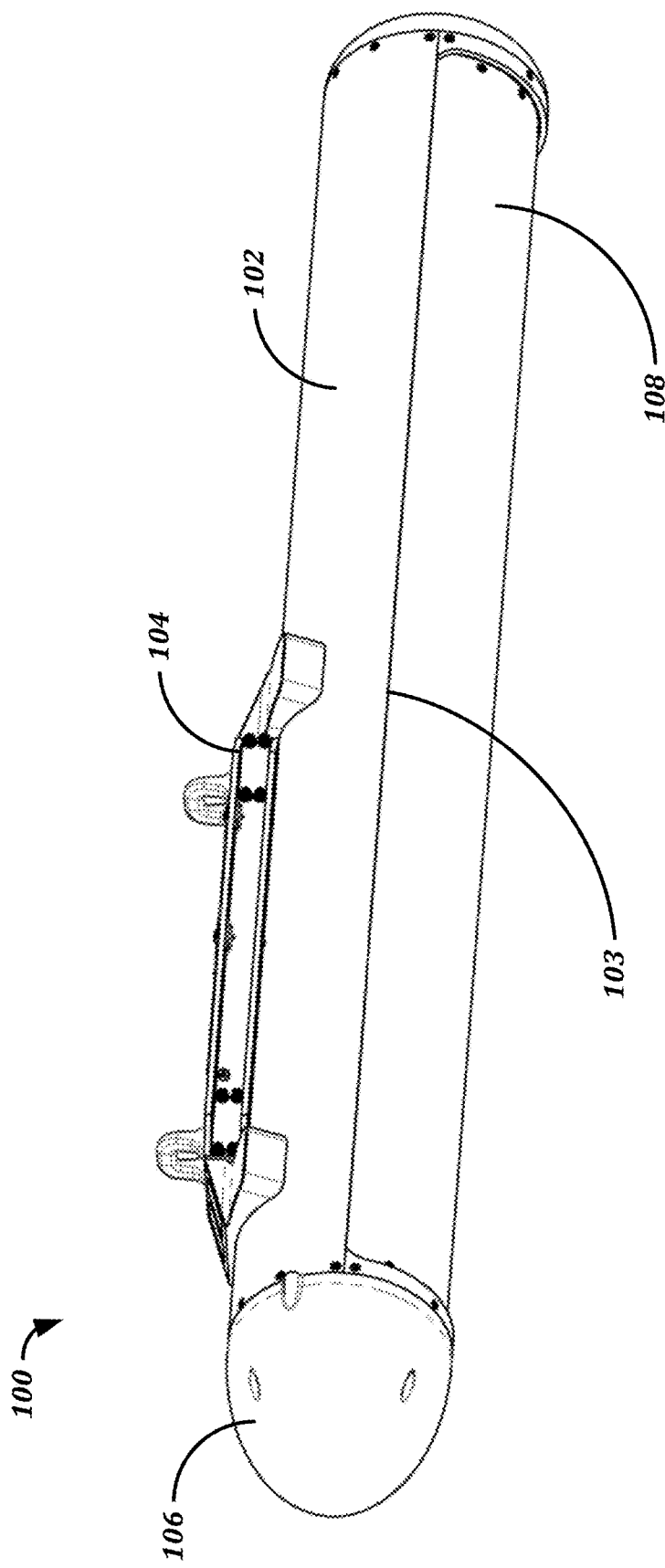
FIG. 1 illustrates a perspective view of a launcher device.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

As discussed above, deploying devices such as drones, unmanned aerial vehicles, munitions, buoys or other payload from flying aircraft is challenging. If the payload is, for example, a drone mounted to the underside of an aircraft, the drone may have wings and other control surfaces that can cause drag and affect the flight characteristics of the aircraft. Furthermore, if components of the drone fall off the drone during operation, they may cause foreign object damage (FOD) to the aircraft.

Some drones have collapsible wings and control surfaces that could potentially allow such drones to be attached to the underside of an aircraft fuselage with its wings and control surfaces retracted. Such an arrangement may reduce drag on the aircraft, but it does not reduce the chances of FOD caused by the drone. The arrangement subjects the drone to the elements, which may cause the drone to malfunction. The aforementioned drone-to-aircraft attachments discussed fail to protect the drone as it may be subjected to high winds, high altitude, and a variety other environmental factors such as, for example, rain, snow, and extreme temperatures when exposed under an aircraft.

The embodiments described herein offer a launcher that is operative to receive and retain a drone or other payload and launch the payload. Accordingly, a launching enclosure may be designed to protect the drone from the elements as well as protect aircraft from potential foreign object damage caused by the system. The launcher may be configured to be installed under, for example, the fuselage, under a wing, or to another surface on an aircraft.

The launcher may be configured with a rotating door. The rotating door may open to, for example, receive the payload. The door may then be closed, thereby encasing the payload in the launching assembly. Such an arrangement protects the drone from the elements. Furthermore, in embodiments in which a drone may be configured within the launcher as payload, such arrangement may also protect the aircraft from some potential consequences of having the drone mounted on the aircraft such as foreign object damage and increased drag.

Though the embodiments described herein include a drone as the payload of the launcher, the payload may include any type of device such as, for example, sensors, buoys, munitions, or any other device or object suitable for releasing from an aircraft in flight.

FIG. 1 illustrates a perspective view of a launcher 100. Launcher 100 includes a body portion 102 that is substantially tubular. Body portion 102 may be formed from, for example, but not limited to, a metallic, plastic, or composite material. A mounting portion 104 is attached to body portion 102. The mounting portion 104 is operative to attach to the aircraft, such as on pilons on an underside portion of an aircraft, such as, but not limited to, the fuselage or wings of the aircraft. The mounting portion 104 may be formed from, for example, but not limited to, a combination or metallic, plastic, and composite materials.

A nose cone 106 is arranged in a forward portion of the launcher 100. Nose cone 106 may be formed from, for example, but not be limited to, a metallic, plastic, or composite material. The launcher 100 may further comprise a door portion 108. Door portion 108 may be configured and operative to rotate about an axis of rotation. In some embodiments, the axis of rotation may be substantially parallel to the longitudinal axis 103 of launcher 100. Still consistent with embodiments of the disclosure, the axis of rotation may be substantially concentric with longitudinal axis 103.

Figure 2:
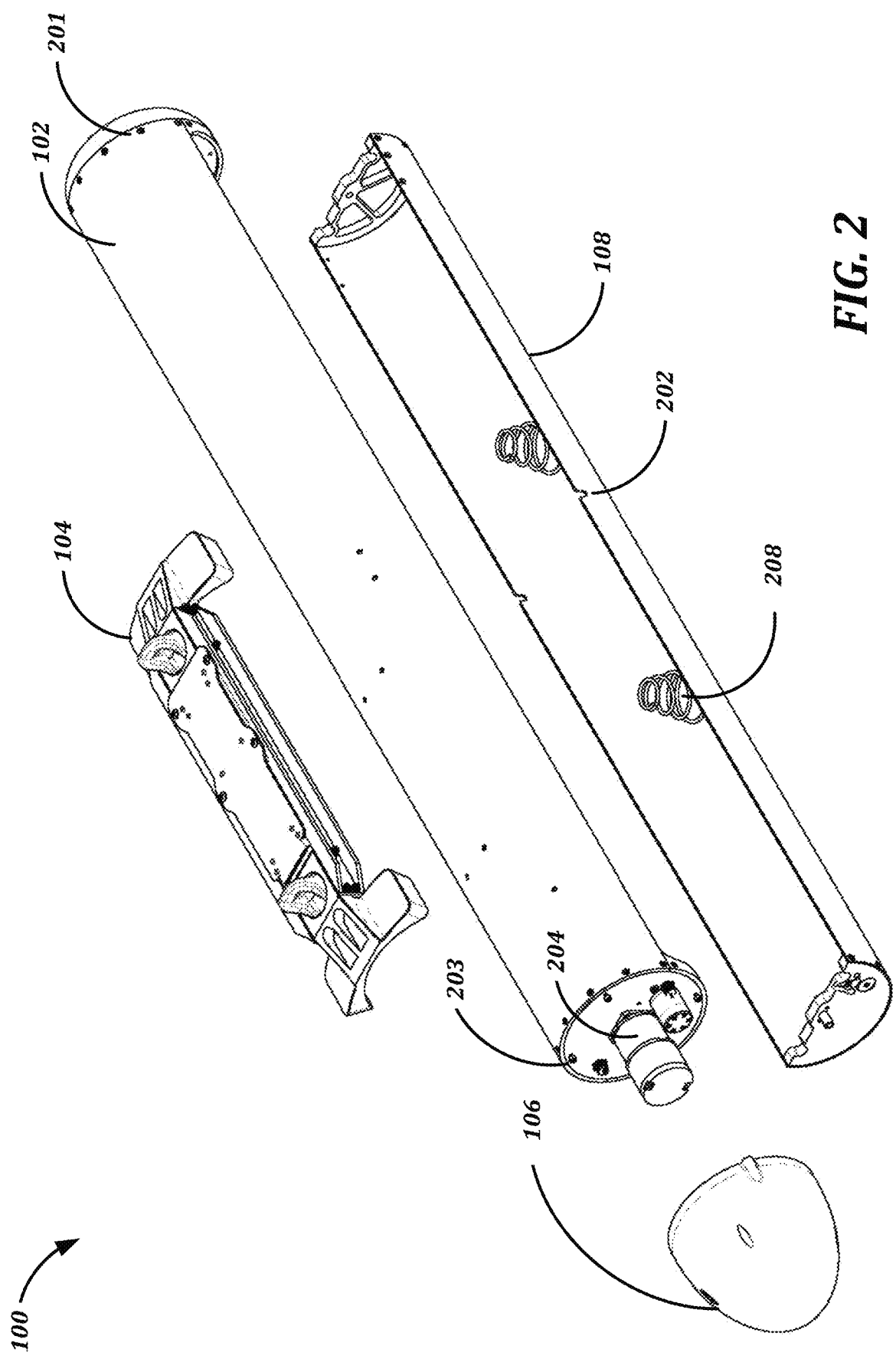
FIG. 2 illustrates a perspective and partially exploded view of the device.

FIG. 2 illustrates a perspective and partially exploded view of an embodiment of the launcher 100. Accordingly, in some embodiments, body portion 102 may be substantially tubular in shape and has a first distal end 201 and a second distal end 203. An electronics, sensor and control portion 204 may be located at, for example, a location proximate to the second distal end 203. The control portion 204 may comprise, for example, a drive motor that is operative to drive the opening and closing of the door portion 108, electromechanical linkages, electronic circuits, controllers and processors that may be used to operate the launcher 100 to open and close door portion 108. In some embodiments, control portion 204 may include sensors or antennas that connect to the payload (not shown). One example of some of the components that control portion 204 may comprise is illustrated and described with reference to a computing system 700 in FIG. 7. Control portion 204 may be protected by a nose cone 106, which has an aerodynamic shape that directs airflow and reduces drag caused by launcher 100.

Launcher 100 may comprise at least one biasing and fastening mechanism. The biasing and fastening mechanism may be arranged throughout the launcher 100 and adapted to meet the form factor and other parameters associated with specific payloads. In some embodiments, door portion 108 may comprise fastening portions that assist in retaining the payload and securing the payload in the launcher 100; the fastening portions may be formed from, for example, but not limited to, metal, plastic, composite, or a mailable or compressible foam materials.

By way of non-limiting example, in a first instance, the biasing and fastening mechanisms may serve to keep the payload in a desired orientation within the payload. In another instance, the biasing and fastening mechanisms may serve to detachably couple the payload to and from the door portion 108.

Accordingly, in some embodiments, the at least one biasing and fastening mechanism may further comprise at least one bracket 202, such as the illustrated notch, to further facilitate at least one of the following: i) the desired alignment of the payload within body 102; and ii) a desired release dynamics of the payload out of the bay area. For example, the at least one bracket 202 may be configured to detachably couple with at least a portion of the payload. In some embodiments, an intermediary device may be used to couple the payload with the at least one bracket 202. The detachable coupling may be configured to enable a first orientation of the payload within the launcher at rest, and a second orientation of the payload within the launcher upon release. The change of orientation of the payload may correspond to the change of orientation of door portion 108 as it rotates within the launcher to expose the bay area. As will be illustrated with reference to FIGS. 3A-3E, the at least one bracket 202 may serve to transfer an angular momentum of door portion 108's rotation to the payload, thereby enabling a rolling release of the payload from launcher 100.

Furthermore, in some embodiments, launcher 100 may comprise at least one force generating mechanism 208. The force generating mechanism 208 may be used to impart a force upon the payload in the first orientation and in the second orientation. The force may serve to keep the payload at a desired position, angle, or otherwise orientation with body 102. For example, adjusting the location of the force generating 208 may affect the orientation of the payload within the body 102. Furthermore, during a launch of the payload, the force may serve to more quickly increase the separation distance between the payload and launcher 100. In some embodiments, force generating mechanism 208 may comprise any suitable type of arrangement including, for example, but not limited to, any one or more of the following: leaf springs, coil springs, or other types of arrangements operative to impart a biasing force on the payload, and may be arranged based on a type of the payload. Though the illustrated embodiment includes the force generating mechanism 208, other embodiments may exclude such components, yet still provide the technical advantages described herein.

FIGS. 3A to 3E illustrate the launching procedure of the launcher 100 as it transitions from a first orientation to a second orientation. In the illustrated example of FIG. 3A, the door portion 108 is in a fully closed position with a payload 300 in the first orientation.

In the first orientation, the payload may be arranged resting within door portion 108. In some embodiments, at least one bracket 202 may be detachable coupled to the payload in order to maintain the payload's position and orientation within launcher 100. One example of a coupling mechanism provided by at least one bracket 202 is disclosed with reference to FIG. 3E.

Figure 3A:
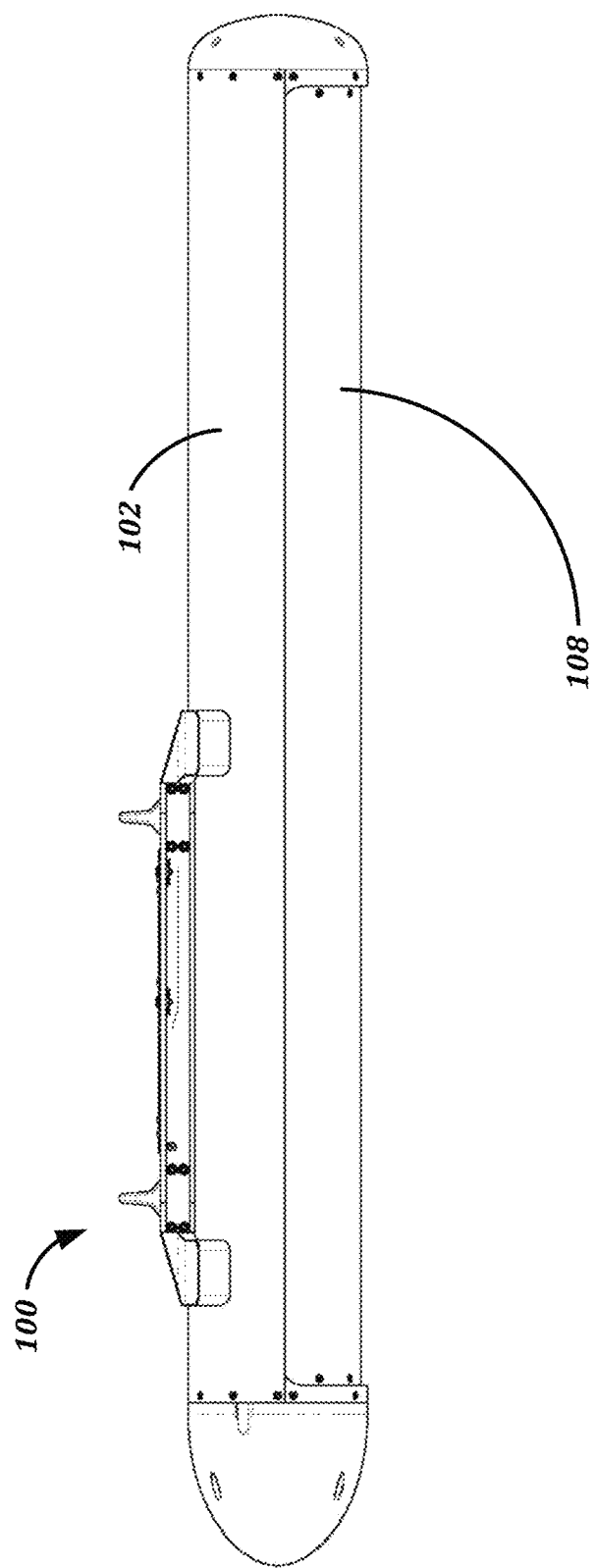
FIGS. 3A to 3E illustrate a launching procedure of the device.
Figure 3B:
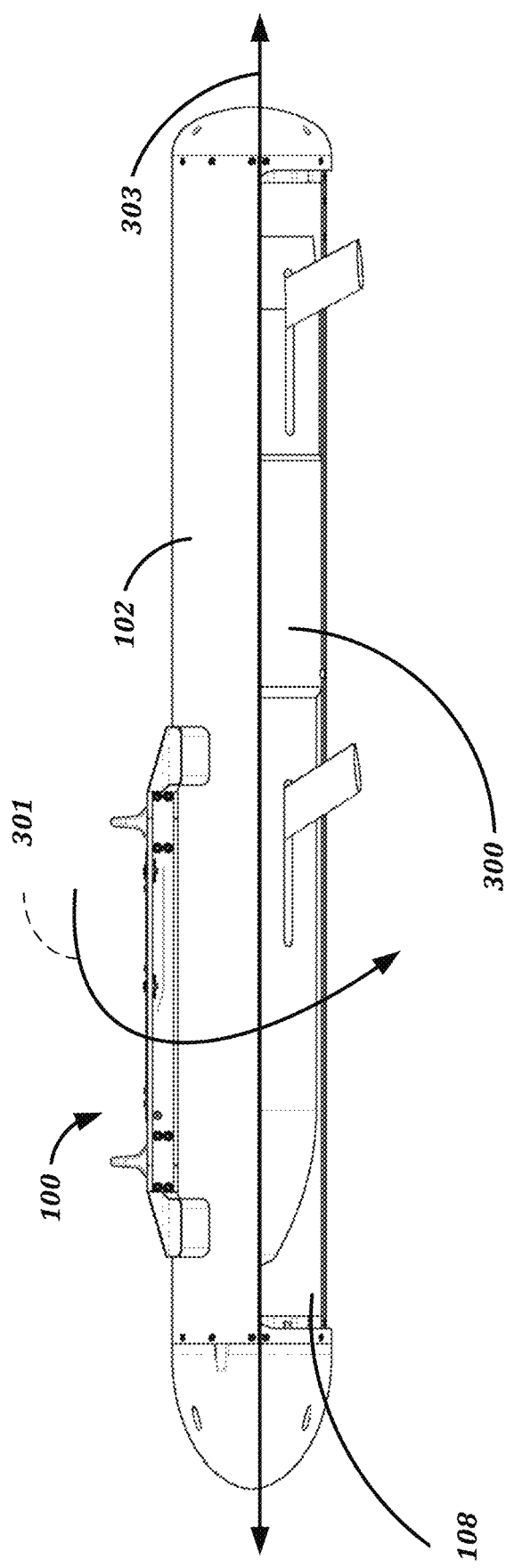

Referring now to FIG. 3B, the door portion 108 may be rotated about a rotational axis 303 while retaining the payload 300 such that a portion of the payload 300 is exposed. In one example, door portion 108 may be configured to rotate in a rotational direction 301, thereby providing a corresponding angular momentum in said rotational direction 301. The angular momentum may be transferred, by way of the coupling mechanism, to payload 300, thereby causing payload 300 to rotate along with door portion 108.

In some embodiments, the rotational axis 303 of door portion 108 may be approximately parallel to the longitudinal axis 103 of the launcher 100, with the rotational direction 301 approximately concentric with body 102. In other example embodiments, the door portion 108 may be may be arranged such that the door rotates about an axis (e.g., a shaft and bearing) that is offset from a central longitudinal axis 103.

Figure 3C:
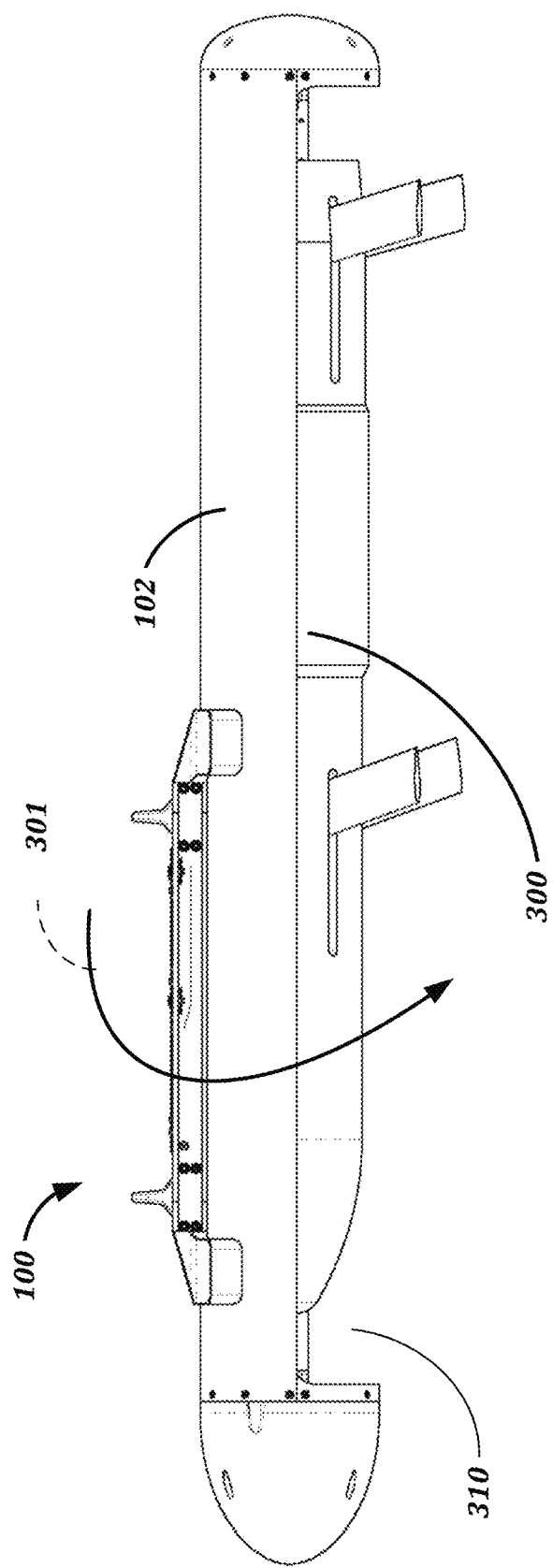

FIG. 3C illustrates a side view of the launcher 100 where the door portion 108 (shown in FIG. 3B) is in a fully open position exposing the payload 300 in a bay area 310 of the launcher 100. Here, payload 300 and door portion 108 may be arranged in the second orientation.

In the second orientation, door portion 108 may be rotated within body 102 to expose the bay area 310. The coupling mechanism used to keep payload 300 in the first orientation as door portion 108 rotates may now be designed to decouple and release payload 300 in the second orientation. One example of such decoupling is disclosed with reference to FIG. 3E.

Figure 3D:
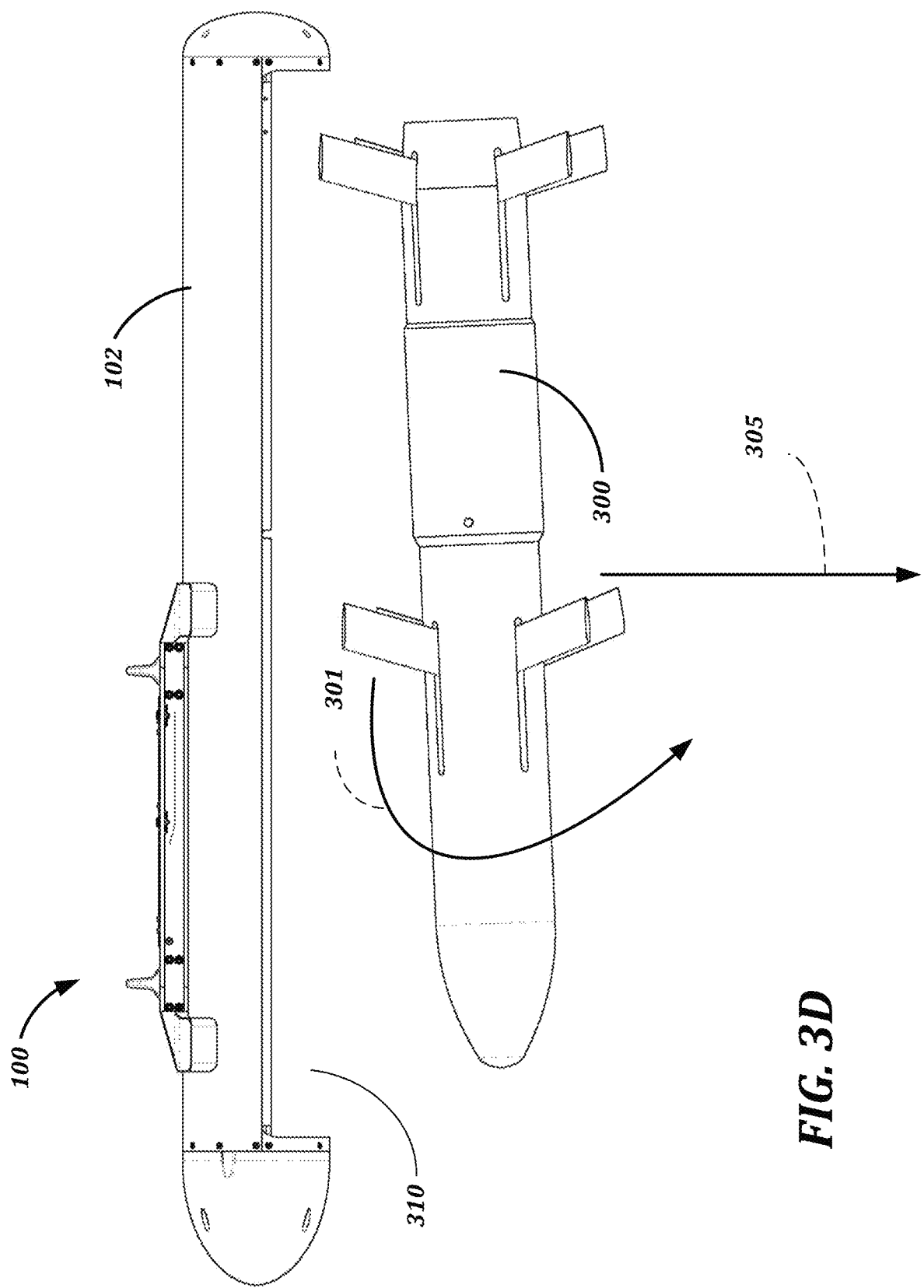

FIG. 3D illustrates a side view of the deployment of the payload 300. In this regard, the door portion 108 and payload 300 (of FIG. 3B) are rotated within the body portion 102 so that it is partly obscured by the body portion 102. The door 108 position exposes an inner cavity or bay area 310 that houses the payload 300. Payload 300 may then be released. In some embodiments, the releasing force may be approximately equal to the gravitation force 305 acting on payload 300. In further embodiments, at least one force generating mechanism 208 may provide a contributing push against payload 300 to facilitate a more forceful release.

Figure 3E:
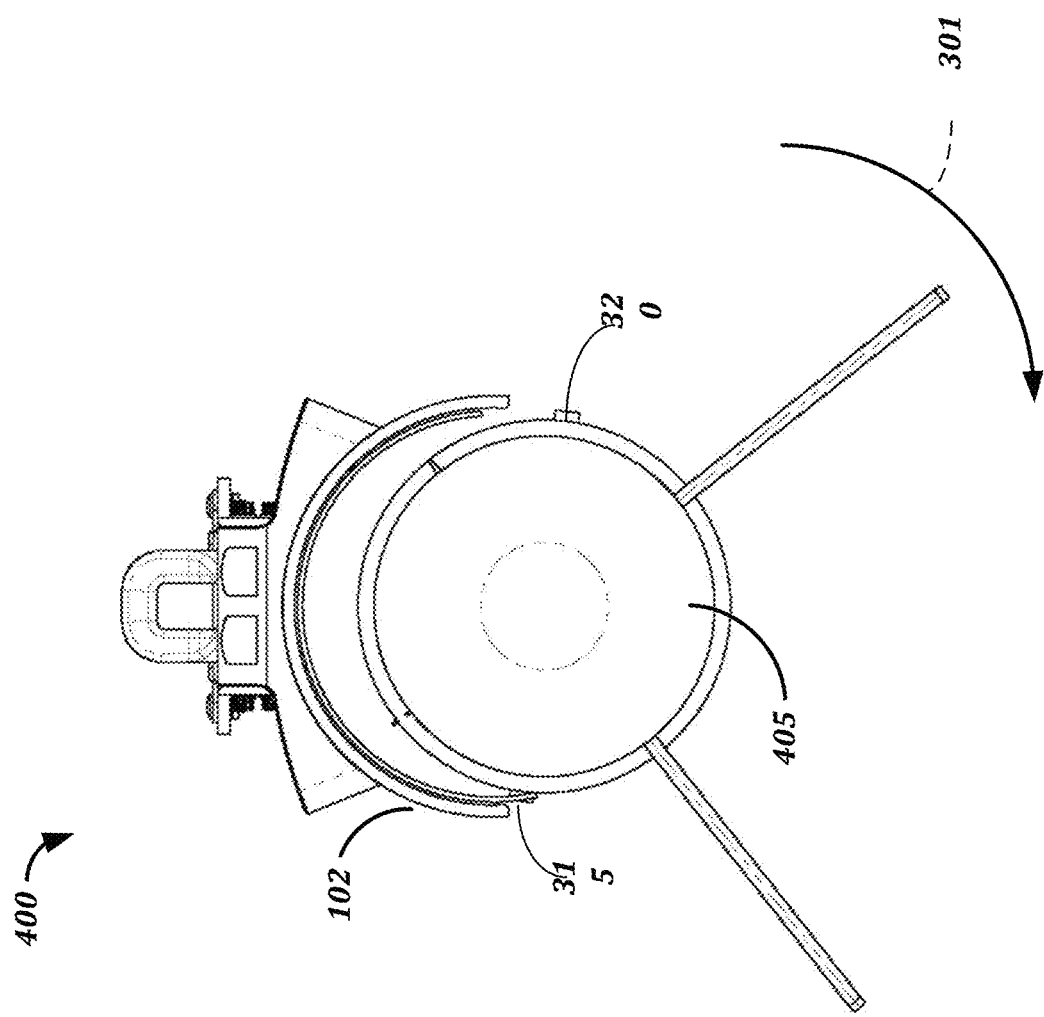

In addition to the release forces acting upon the payload 300 (e.g., gravitation force 305), the mechanism coupling door portion 108 and payload 300 enables a transition of the payload from the first orientation to the second orientation and, in turn, transfers an angular momentum to payload 300 as door portion 108 rotates within the body of the launcher to expose bay area 310. Said angular momentum provides for a "rolling release" of the payload as it exits bay area 310. FIG. 3E illustrates one example of such coupling mechanism.

In some embodiments, payload 300 may comprise, for example, a first pin 315 and a second pin 320. The pins may be detachable coupled, or inserted, into at least one bracket 202 or "notch". As door portion 108 rotates about rotational axis 303, at least one bracket 202, by way of contact pins 315 and 320 (the specific pin may depend upon the rotational direction 301), transfer the angular momentum to payload 300 along the rotational direction 301. Accordingly, in this illustrated example, the pin and notch along the rotational direction 301 serve as a pivot point for the payload's rolling release out of bay area 310.

In the illustrated example embodiments in FIGS. 3A-3E, payload 300 is a drone that has retractable and extendable wings another flight surfaces. As bay area 310 is exposed by means of door portion 108's rotation, certain surfaces of payload 300 may begin to expand. Force generating means 208 (not illustrated in FIG. 3E) may provide an additional source of energy to increase the displacement of payload 300 as it continues to expand. Accordingly, where the payload may be designed to expand upon a release from the launcher, such expansion may occur a greater displacement from the launcher than would otherwise occur without the additional force provided by the force generating mechanism.

Figure 4:
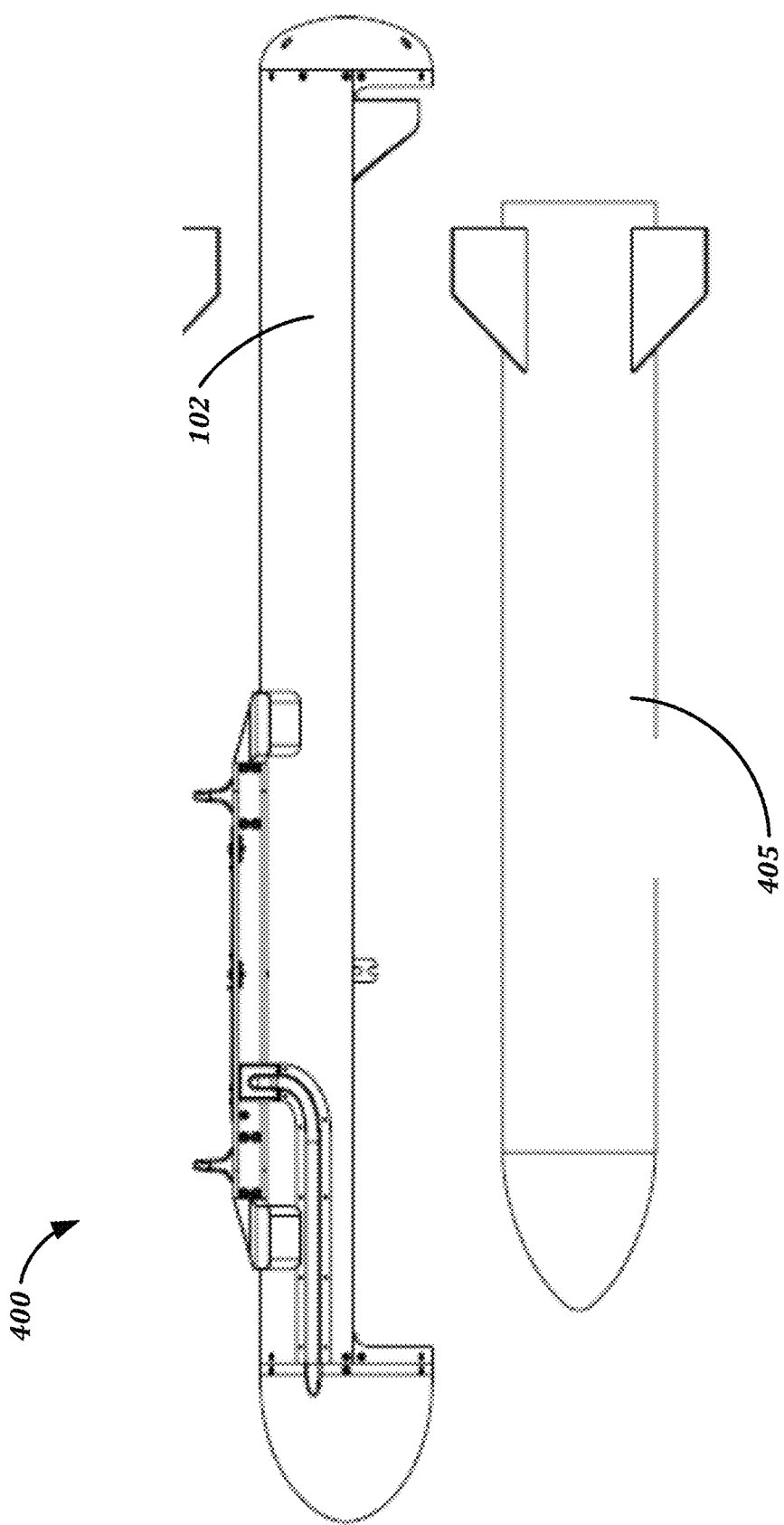
FIG. 4 illustrates another example embodiment of the device.

FIG. 4 illustrates another example embodiment of the launcher device 400. The device 400 as shown in FIG. 4 is operative to receive and launch a munition 400 in a similar way as discussed above in FIGS. 3A to 3D where the payload 300 was stored and launched. Some payload may have different coupling mechanisms, while some payloads may have no coupling mechanisms at all. As described above, launcher 100 may be adapted to carry and launch any type of payload that will fit in the cavity 304 of the launcher 100.

Figure 5:
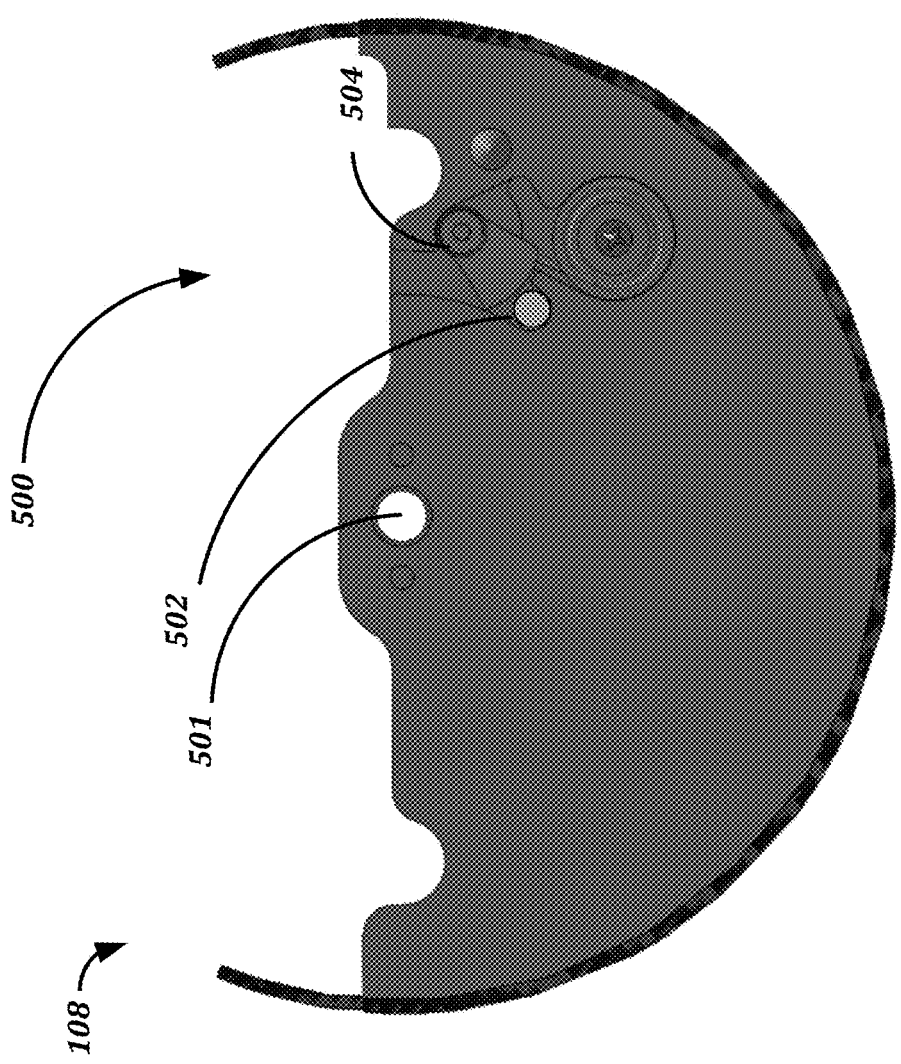
FIG. 5 illustrates a front view of a portion of the door portion.

FIG. 5 illustrates a front view of a distal end portion of the door portion 108. The axis of rotation of the door portion 108 is shown by the element 501, for receiving a control element from control portion 204. FIG. 5 shows a locking mechanism 500 as shown in the illustrated example embodiment that a includes a pin 502 that is operative to engage and disengage a rotation capability of door portion 108. A control mechanism 504 may be operative with control portion 204 to engage or disengage pin 502. Accordingly, the travel of the door portion 108 is substantially impeded when the locking mechanism 500. The engagement of the pin substantially retains the door portion 108 and prevents the door 108 from rotating about the element 501 undesirably.

Embodiments of the present disclosure provide a hardware and software platform operative by a set of methods and computer-readable media comprising instructions configured to operate the aforementioned modules and computing elements in accordance with the methods. The following depicts an example of at least one method of a plurality of methods that may be performed by at least one of the aforementioned modules. Various hardware components may be used at the various stages of operations disclosed with reference to each module.

For example, although methods may be described to be performed by a single computing device, it should be understood that, in some embodiments, different operations may be performed by different networked elements in operative communication with the computing device. For example, at least one computing device 700 may be employed in the performance of some or all of the stages disclosed with regard to the methods. Similarly, an apparatus may be employed in the performance of some or all of the stages of the methods. As such, the apparatus may comprise at least those architectural components as found in computing device 700.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

Figure 6:
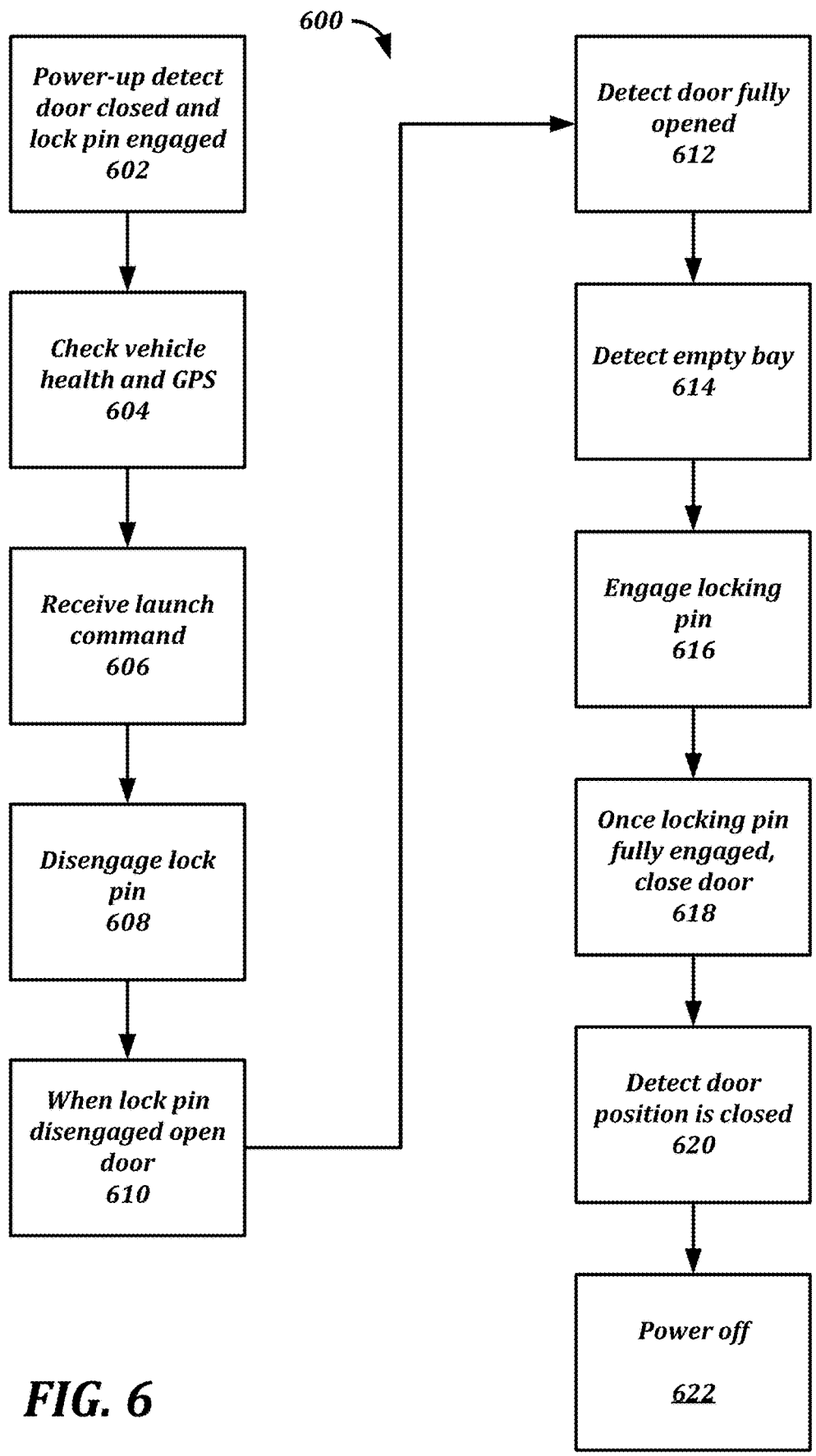
FIG. 6 illustrates a block diagram of an example method for operation of the device.

FIG. 6 illustrates a block diagram of an example method 600 for operation of the launcher 100. In block 602, the launcher 100 powers up and determines whether door portion 108 is closed and the lock pin 502 is engaged. In block 604, the health of payload 300 and the navigation portions are checked for proper operation. A launch command is received in block 606.

In block 608, the lock pin 502 is disengaged, which allows door portion 108 to rotate. In block 610 lock pin 502 door portion 108 rotates open. In block 612, a signal indicating the door is opened is received. In block 614 an empty bay area 310 is detected. The locking pin 502 is re-engaged in block 616. The door portion 108 is then closed. In block 620 a signal indicating the door portion 108 is closed is received. In block 622 the launcher 100 powers off.

The embodiments described above offer a launcher device that is operative to receive and retain a drone or other payload in a protected launcher. The launcher helps to reduce the drag of the payload and to protect the payload from environmental factors. The payload is launched when a rotating door opens to expose the payload. The rotating door may be parallel or concentric to a longitudinal axis of the body portion of the device. In some embodiments, the payload may be launched using a spring or biasing arrangement that may induce a substantially downward force on the payload during launch.

Figure 7:
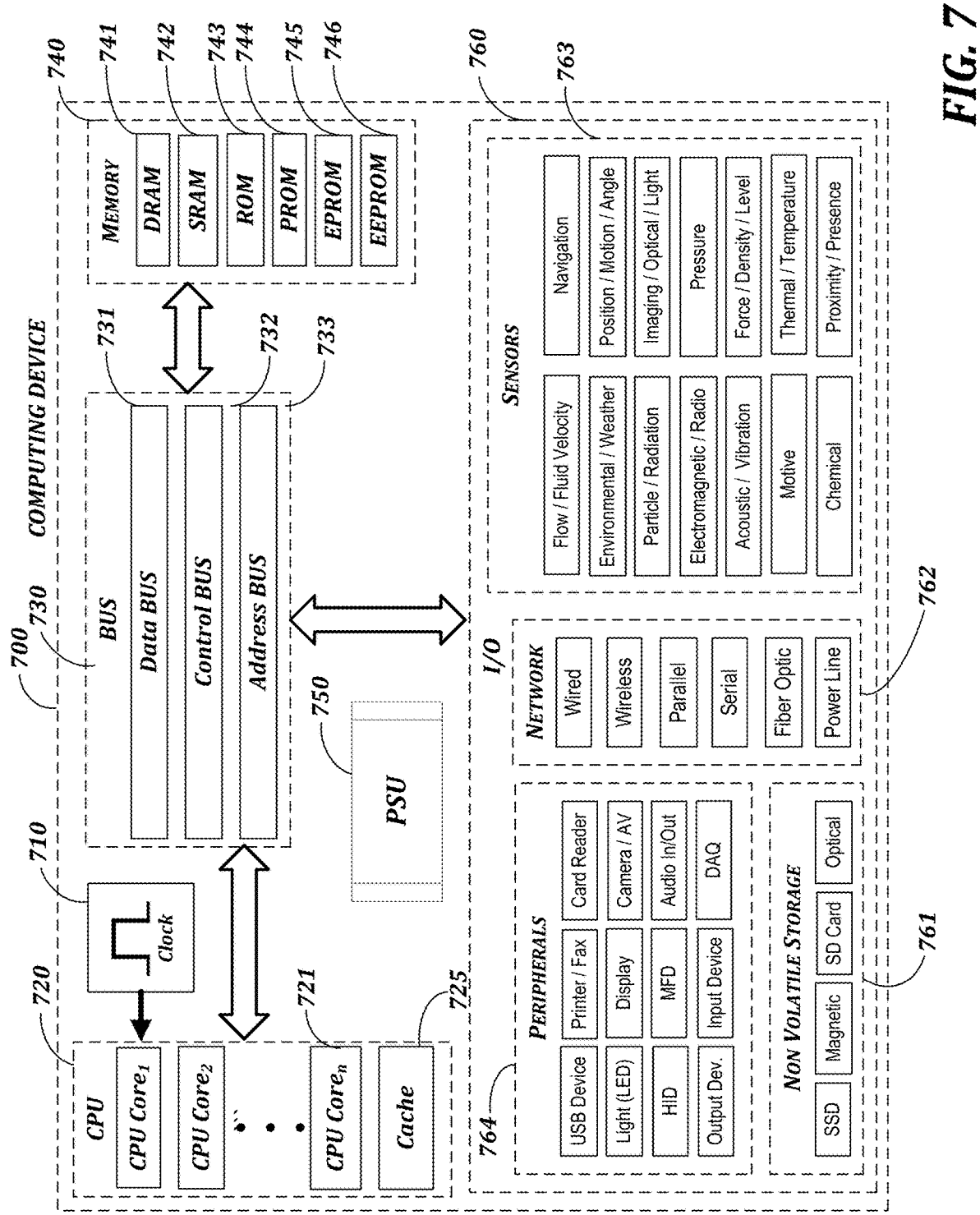
FIG. 7 is a block diagram of a system including a computing device operable with the launcher device.

Launcher 100 may comprise the components of a computing device 700 as illustrated in FIG. 7. Furthermore, launcher 100 may operable in conjunction with the computing device 700, which may comprise, but not be limited to the following:

Mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS400/iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be rack mounted, a workstation, an industrial device, a raspberry pi, a desktop, or an embedded device;

FIG. 7 is a block diagram of a system including computing device 700. Consistent with an embodiment of the disclosure, the aforementioned CPU 720, the bus 730, the memory unit 740, a PSU 750, and the plurality of I/O units 760 may be implemented in a computing device, such as computing device 700 of FIG. 7. Any suitable combination of hardware, software, or firmware may be used to implement the aforementioned units. For example, the CPU 720, the bus 730, and the memory unit 740 may be implemented with computing device 700 or any of other computing devices 700, in combination with computing device 700. The aforementioned system, device, and components are examples and other systems, devices, and components may comprise the aforementioned CPU 720, the bus 730, the memory unit 740, consistent with embodiments of the disclosure.

A computing device 700 does not need to be electronic, nor even have a CPU 720, nor bus 730, nor memory unit 740. The definition of the computing device 700 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 700, especially if the processing is purposeful.

With reference to FIG. 7, a system consistent with an embodiment of the disclosure may include a computing device, such as computing device 700. In a basic configuration, computing device 700 may include at least one clock module 710, at least one CPU 720, at least one bus 730, and at least one memory unit 740, at least one PSU 750, and at least one I/O 760 module, wherein I/O module may be comprised of, but not limited to a non-volatile storage sub-module 761, a communication sub-module 762, a sensors sub-module 763, and a peripherals sub-module 764.

A system consistent with an embodiment of the disclosure the computing device 700 may include the clock module 710 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 720, the central component of modern computers, which relies on a clock. The only exceptions are asynchronous circuits such as asynchronous CPUs. The clock 710 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 4 wires.

Many computing devices 700 use a "clock multiplier" which multiplies a lower frequency external clock to the appropriate clock rate of the CPU 720. This allows the CPU 720 to operate at a much higher frequency than the rest of the computer, which affords performance gains in situations where the CPU 720 does not need to wait on an external factor (like memory 740 or input/output 760). Some embodiments of the clock 710 may include dynamic frequency change, where, the time between clock edges can vary widely from one edge to the next and back again.

A system consistent with an embodiment of the disclosure the computing device 700 may include the CPU unit 720 comprising at least one CPU Core 721. A plurality of CPU cores 721 may comprise identical CPU cores 721, such as, but not limited to, homogeneous multi-core systems. It is also possible for the plurality of CPU cores 721 to comprise different CPU cores 721, such as, but not limited to, heterogeneous multi-core systems, big.LITTLE systems and some AMD accelerated processing units (APU). The CPU unit 720 reads and executes program instructions which may be used across many application domains, for example, but not limited to, general purpose computing, embedded computing, network computing, digital signal processing (DSP), and graphics processing (GPU). The CPU unit 720 may run multiple instructions on separate CPU cores 721 at the same time. The CPU unit 720 may be integrated into at least one of a single integrated circuit die and multiple dies in a single chip package. The single integrated circuit die and multiple dies in a single chip package may contain a plurality of other aspects of the computing device 700, for example, but not limited to, the clock 710, the CPU 720, the bus 730, the memory 740, and I/O 760.

The CPU unit 720 may contain cache 722 such as, but not limited to, a level 1 cache, level 2 cache, level 3 cache or combination thereof. The aforementioned cache 722 may or may not be shared amongst a plurality of CPU cores 721. The cache 722 sharing comprises at least one of message passing and inter-core communication methods may be used for the at least one CPU Core 721 to communicate with the cache 722. The inter-core communication methods may comprise, but not limited to, bus, ring, two-dimensional mesh, and crossbar. The aforementioned CPU unit 720 may employ symmetric multiprocessing (SMP) design.

The plurality of the aforementioned CPU cores 721 may comprise soft microprocessor cores on a single field programmable gate array (FPGA), such as semiconductor intellectual property cores (IP Core). The plurality of CPU cores 721 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 721, for example, but not limited to Instruction-level parallelism (ILP) such as, but not limited to, super-scalar pipelining, and Thread-level parallelism (TLP).

Consistent with the embodiments of the present disclosure, the aforementioned computing device 700 may employ a communication system that transfers data between components inside the aforementioned computing device 700, and/or the plurality of computing devices 700. The aforementioned communication system will be known to a person having ordinary skill in the art as a bus 730. The bus 730 may embody internal and/or external plurality of hardware and software components, for example, but not limited to a wire, optical fiber, communication protocols, and any physical arrangement that provides the same logical function as a parallel electrical bus. The bus 730 may comprise at least one of, but not limited to a parallel bus, wherein the parallel bus carry data words in parallel on multiple wires, and a serial bus, wherein the serial bus carry data in bit-serial form. The bus 730 may embody a plurality of topologies, for example, but not limited to, a multidrop/electrical parallel topology, a daisy chain topology, and a connected by switched hubs, such as USB bus. The bus 730 may comprise a plurality of embodiments, for example, but not limited to:

Internal data bus (data bus) 731/Memory bus
Control bus 732
Address bus 733
System Management Bus (SMBus)
Front-Side-Bus (FSB)
External Bus Interface (EBI)
Local bus
Expansion bus
Lightning bus
Controller Area Network (CAN bus)
Camera Link
ExpressCard
Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
Small Computer System Interface (SCSI)/Serial Attached SCSI (SAS)
HyperTransport
InfiniBand
RapidIO
Mobile Industry Processor Interface (MIPI)
Coherent Processor Interface (CAPI)
Plug-n-play
1-Wire
Peripheral Component Interconnect (PCI), including embodiments such as, but not limited to, Accelerated Graphics Port (AGP), Peripheral Component Interconnect eXtended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal IO, Thunderbolt/Mini DisplayPort, Mobile PCIe (M-PCIe), U.2, and Non-Volatile Memory Express (NVMe)/Non-Volatile Memory Host Controller Interface Specification (NVMHCIS).
Industry Standard Architecture (ISA), including embodiments such as, but not limited to Extended ISA (EISA), PC/XT-bus/PC/AT-bus/PC/104 bus (e.g., PC/104-Plus, PCI/104-Express, PCI/104, and PCI-104), and Low Pin Count (LPC).
Music Instrument Digital Interface (MIDI)
Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1394 Interface/Firewire, Thunderbolt, and eXtensible Host Controller Interface (xHCI).

Consistent with the embodiments of the present disclosure, the aforementioned computing device 700 may employ hardware integrated circuits that store information for immediate use in the computing device 700, know to the person having ordinary skill in the art as primary storage or memory 740. The memory 740 operates at high speed, distinguishing it from the non-volatile storage sub-module 761, which may be referred to as secondary or tertiary storage, which provides slow-to-access information but offers higher capacities at lower cost. The contents contained in memory 740, may be transferred to secondary storage via techniques such as, but not limited to, virtual memory and swap. The memory 740 may be associated with addressable semiconductor memory, such as integrated circuits consisting of silicon-based transistors, used for example as primary storage but also other purposes in the computing device 700. The memory 740 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 741, Static Random-Access Memory (SRAM) 742, CPU Cache memory 725, Advanced Random-Access Memory (A-RAM), and other types of primary storage such as Random-Access Memory (RAM).

Non-volatile memory which can retain stored information even after power is removed, for example, but not limited to, Read-Only Memory (ROM) 743, Programmable ROM (PROM) 744, Erasable PROM (EPROM) 745, Electrically Erasable PROM (EEPROM) 746 (e.g., flash memory and Electrically Alterable PROM [EAPROM]), Mask ROM (MROM), One Time Programable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 700 may employ the communication system between an information processing system, such as the computing device 700, and the outside world, for example, but not limited to, human, environment, and another computing device 700. The aforementioned communication system will be known to a person having ordinary skill in the art as I/O 760. The I/O module 760 regulates a plurality of inputs and outputs with regard to the computing device 700, wherein the inputs are a plurality of signals and data received by the computing device 700, and the outputs are the plurality of signals and data sent from the computing device 700. The I/O module 760 interfaces a plurality of hardware, such as, but not limited to, non-volatile storage 761, communication devices 762, sensors 763, and peripherals 764. The plurality of hardware is used by the at least one of, but not limited to, human, environment, and another computing device 700 to communicate with the present computing device 700. The I/O module 760 may comprise a plurality of forms, for example, but not limited to channel I/O, port mapped I/O, asynchronous I/O, and Direct Memory Access (DMA).

Consistent with the embodiments of the present disclosure, the aforementioned computing device 700 may employ the non-volatile storage sub-module 761, which may be referred to by a person having ordinary skill in the art as one of secondary storage, external memory, tertiary storage, off-line storage, and auxiliary storage. The non-volatile storage sub-module 761 may not be accessed directly by the CPU 720 without using intermediate area in the memory 740. The non-volatile storage sub-module 761 does not lose data when power is removed and may be two orders of magnitude less costly than storage used in memory module, at the expense of speed and latency. The non-volatile storage sub-module 761 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (761) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 700 may employ the communication sub-module 762 as a subset of the I/O 760, which may be referred to by a person having ordinary skill in the art as at least one of, but not limited to, computer network, data network, and network. The network allows computing devices 700 to exchange data using connections, which may be known to a person having ordinary skill in the art as data links, between network nodes. The nodes comprise network computer devices 700 that originate, route, and terminate data. The nodes are identified by network addresses and can include a plurality of hosts consistent with the embodiments of a computing device 700. The aforementioned embodiments include, but not limited to personal computers, phones, servers, drones, and networking devices such as, but not limited to, hubs, switches, routers, modems, and firewalls.

Two nodes can be said are networked together, when one computing device 700 is able to exchange information with the other computing device 700, whether or not they have a direct connection with each other. The communication sub-module 762 supports a plurality of applications and services, such as, but not limited to World Wide Web (WWW), digital video and audio, shared use of application and storage computing devices 700, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 4 [IPv4], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 762 may comprise a plurality of size, topology, traffic control mechanism and organizational intent. The communication sub-module 762 may comprise a plurality of embodiments, such as, but not limited to:

Wired communications, such as, but not limited to, coaxial cable, phone lines, twisted pair cables (ethernet), and InfiniBand.

Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G,4G (such as WiMax and LTE), and 5G (short and long wavelength).

Parallel communications, such as, but not limited to, LPT ports.

Serial communications, such as, but not limited to, RS-232 and USB.

Fiber Optic communications, such as, but not limited to, Single-mode optical fiber (SMF) and Multi-mode optical fiber (MMF).

Power Line communications

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 700 may employ the sensors sub-module 763 as a subset of the I/O 760. The sensors sub-module 763 comprises at least one of the devices, modules, and subsystems whose purpose is to detect events or changes in its environment and send the information to the computing device 700. Sensors are sensitive to the measured property, are not sensitive to any property not measured, but may be encountered in its application, and do not significantly influence the measured property. The sensors sub-module 763 may comprise a plurality of digital devices and analog devices, wherein if an analog device is used, an Analog to Digital (A-to-D) converter must be employed to interface the said device with the computing device 700. The sensors may be subject to a plurality of deviations that limit sensor accuracy. The sensors sub-module 763 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezocapacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 700 may employ the peripherals sub-module 762 as a subset of the I/O 760. The peripheral sub-module 764 comprises ancillary devices uses to put information into and get information out of the computing device 700. There are 3 categories of devices comprising the peripheral sub-module 764, which exist based on their relationship with the computing device 700, input devices, output devices, and input/output devices.

Input devices send at least one of data and instructions to the computing device 700. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 700. Output devices convert electronically generated information into a form that can be presented to humans. Input/output devices perform that perform both input and output functions. It should be understood by a person having ordinary skill in the art that the ensuing are non-limiting embodiments of the aforementioned peripheral sub-module 764:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 700. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 700 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrumental Digital Interface (MIDI) devices such as, but not limited to a keyboard, and headset.

Data AcQuisition (DAQ) devices covert at least one of analog signals and physical parameters to digital values for processing by the computing device 700. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:
- Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).
- Printers, such as, but not limited to, inkjet printers, laser printers, 3D printers, solid ink printers and plotters.
- Audio and Video (AV) devices, such as, but not limited to, speakers, headphones, amplifiers and lights, which include lamps, strobes, DJ lighting, stage lighting, architectural lighting, special effect lighting, and lasers.
- Other devices such as Digital to Analog Converter (DAC)

Input/Output Devices may further comprise, but not be limited to, touchscreens, networking device (e.g., devices disclosed in network 762 sub-module), data storage device (non-volatile storage 761), facsimile (FAX), and graphics/sound cards.

The following is claimed:

1. A configurable payload deployment system, the system comprising:
    a launcher;
    a rotating door operative to rotate between a first arrangement and a second arrangement, the rotating door configured to:
    when in the first arrangement, enclose an area of the launcher configured to receive a configurable payload, and
    when in the second arrangement, expose the area of the launcher for deployment of the configurable payload; and
    a mechanism attached to the rotating door, the mechanism configured to:
    arrange the configurable payload within the launcher, and
    provide release dynamics for deployment of the configurable payload within the launcher, wherein providing the release dynamics comprises applying a force to the configurable payload to increase displacement between the configurable payload and the launcher over a set time period following deployment of the configurable payload,
    wherein rotation of the rotating door between the first arrangement and the second arrangement provides angular momentum to the mechanism, and wherein the mechanism provides the angular momentum to the configurable payload.

2. The system of claim 1, wherein the launcher is attached to a vehicle as a payload.

3. The system of claim 1, wherein the launcher creates less drag than the configurable payload.

4. The system of claim 1, wherein the launcher further comprises a nose cone disposed at a forward end of the launcher to reduce drag of the system.

5. The system of claim 1, wherein the rotating door rotates from the first arrangement to the second arrangement within the launcher to expose the configurable payload for deployment.

6. The system of claim 1, wherein the first arrangement of the rotating door prevents exposure of the configurable payload to an external environment.

7. The system of claim 1, wherein the rotating door is controlled by a drive mechanism on the launcher.

8. The system of claim 1, wherein the mechanism is further configured to secure the configurable payload within the launcher.

9. The system of claim 1, wherein the rotating door is configured to transition from the first arrangement to the second arrangement without interference to control surfaces of the configurable payload.

10. The system of claim 1, wherein the rotating door is configured to release the configurable payload in the second arrangement.

11. The system of claim 1, wherein the rotating door is configured to rotate about a central longitudinal axis of the launcher.

12. The system of claim 1, wherein the rotating door is configured to rotate about a longitudinal axis parallel to and offset from a central longitudinal axis of the launcher.

13. The system of claim 1, wherein the configurable payload comprises one or more of:
    a drone,
    a sensor,
    a buoy,
    a munition,
    a device, or
    an object suitable for deployment from within the launcher.

14. The system of claim 1, wherein the mechanism is configured to change an orientation of the configurable payload in response to a transition of the rotating door from the first arrangement to the second arrangement.

15. The system of claim 1, wherein the mechanism is detachably connected to the configurable payload.

16. The system of claim 1, wherein the mechanism enables a rolling release of the configurable payload from the launcher.

17. The system of claim 1, wherein the mechanism causes the configurable payload to be disposed in a first orientation within the launcher when the rotating door is in the first arrangement and in a second orientation within the launcher when the rotating door is in the second arrangement.

18. The system of claim 1, wherein the mechanism can be configured to apply an opposing force equal to a gravitational force acting on the configurable payload when the rotating door is in the first arrangement.

* * * * *